D. Lasher,
Piston Packing.

N° 17,683.  Patented June 30, 1857.

Witnesses:
Lemuel W. Serrell
Thomas G. Harold

Inventor:
Daniel Lasher

UNITED STATES PATENT OFFICE.

DANIEL LASHER, OF BROOKLYN, NEW YORK.

METALLIC PACKING FOR STEAM-PISTONS.

Specification forming part of Letters Patent No. 17,683, dated June 30, 1857; Reissued September 28, 1858, No. 606.

*To all whom it may concern:*

Be it known that I, DANIEL LASHER, of Brooklyn, in the county of Kings and State of New York, have invented, made, and applied to use a certain new and useful Improvement in Metallic Packings for Steam-Pistons; and I do hereby declare that the following is a full, clear, and exact description of the construction and operation of the same, reference being had to the annexed drawing, making part of this specification, wherein—

Figure 1:
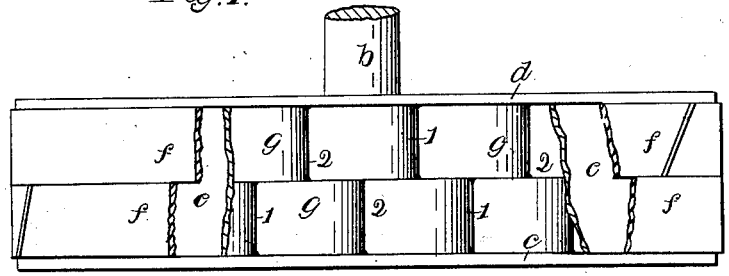
Figure 2:
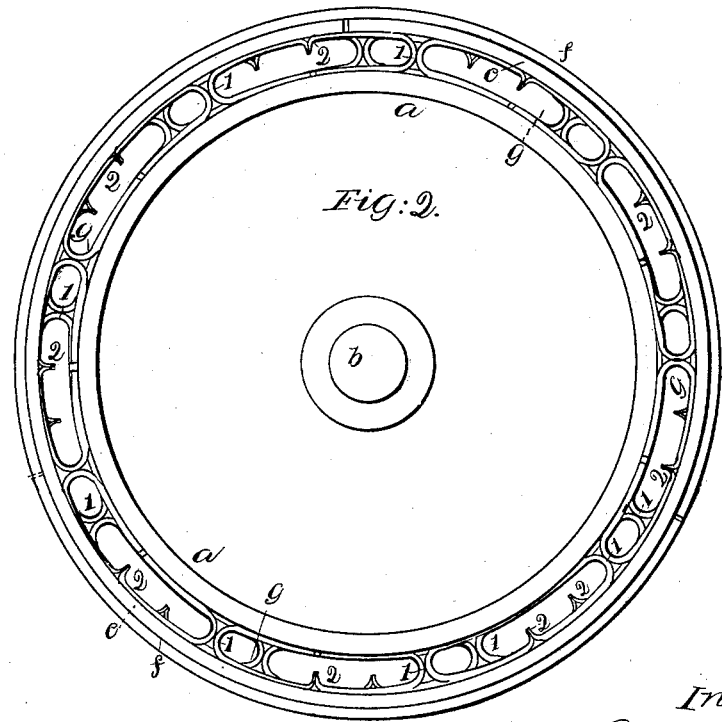

Figure 1, is a plan of a steam piston with the cap removed to show the metallic packings; and Fig. 2, is a side elevation of the piston with the exterior packing rings shown as broken open to represent the interior springs.

Similar marks of reference denote the same parts.

The nature of my said invention consists in a peculiar construction of metallic spring, applied in a peculiar manner between the packing rings and piston, to cause said packing rings to take a more uniform and even bearing on the interior of the cylinder; at the same time said springs, by their peculiar construction, are rendered more permanent and durable under the operation of heat than any other characters of springs; and said springs cannot change their position by vibration and jarring of the engine but remain fully efficient until the metallic rings are worn out. Thereby a great saving is effected in the time occupied in packing the piston, and a great saving is also effected in the wear of the piston and the amount of tallow or other lubricating material supplied into the cylinder, because the metallic packing rings take such an even bearing, by means of my peculiar springs, that there is no opportunity for leakage, and the straining or working of the piston sidewise in sea-going vessels, is by my packing fully allowed for.

In the drawing $a$, is the piston; $b$, the piston rod, $c$, the fixed and $d$, the movable flange or head leaving the space as usual for the packings, and for the full metallic packing ring $e$, and its too exterior packing rings $f, f$, all of which are formed with the split or opening as usual.

It has heretofore been customary to introduce behind the packing ring $e$, between that and the piston, a packing of hemp or other fibrous substances, to cause the rings to take a proper bearing on the interior of the cylinder; elliptical springs have also been used for this purpose, but these devices do not operate evenly over the interior surface of the packing rings, to cause them to press uniformly against the cylinder; and each of the springs heretofore used actually bears only at one point and is subject from its shape to lose its elasticity as well as to change its position and become inoperative. I have therefore devised my spring ($g$) to set between the packing rings and piston. Each of these springs $g$ is formed in the bent shape shown in Fig. 1, and so curved that one arm of the spring sets against the piston and the other takes a bearing on the inside of the ring $e$.

1, is the point at which the springs are bent around, and 2, is a lip or projection formed on the end of one arm, which taking a similar projection or lip on the adjoining spring effectually prevent the springs working around or changing their place.

I make use of two or more tiers of springs according to the thickness of the piston, and arrange the same in the alternate positions shown in Fig. 2, so as to break joints and cause the most even bearing on the ring $e$.

I do not claim metallic springs intervening between the piston and the packing rings, but

What I claim as my invention and desire to secure by Letters Patent is—

The manner herein described of constructing the bent or folded metallic springs to take an even and extended bearing on the inner side of the packing ring or rings, when provided with the lips or projections 2, to keep the springs properly in place, substantially as specified.

In witness whereof I have hereunto set my signature this twelfth day of June, 1837.

DANIEL LASHER.

Witnesses:
  LEMUEL W. SERRELL,
  THOMAS G. HAROLD.

[FIRST PRINTED 1912.]